United States Patent [19]

Krönert et al.

[11] 4,384,858
[45] May 24, 1983

[54] TORSIONALLY ELASTIC SHOCK AND VIBRATION ABSORBING COUPLING

[75] Inventors: Curt Krönert, Mülheim; Friedhelm Dahmen, Herne, both of Fed. Rep. of Germany

[73] Assignee: Thyssen Industrie Aktiengesellschaft, Fed. Rep. of Germany

[21] Appl. No.: 172,149

[22] Filed: Jul. 25, 1980

Related U.S. Application Data

[62] Division of Ser. No. 861,449, Dec. 16, 1977, abandoned.

[30] Foreign Application Priority Data

Dec. 18, 1976 [DE] Fed. Rep. of Germany ....... 2657527
Aug. 19, 1977 [DE] Fed. Rep. of Germany ....... 2737447
Aug. 22, 1977 [DE] Fed. Rep. of Germany ... 7725998[U]

[51] Int. Cl.³ ............................................. F16D 3/62
[52] U.S. Cl. ......................................... 464/56; 464/92
[58] Field of Search ................... 64/12, 11 R, 27 NM; 464/56, 55, 87, 92

[56] References Cited

U.S. PATENT DOCUMENTS

| | | | |
|---|---|---|---|
| 3,178,906 | 4/1965 | Ricketts | 64/11 R |
| 3,283,534 | 11/1966 | Reich | 64/11 R |
| 3,698,209 | 10/1972 | Moro | 64/12 |
| 4,164,877 | 8/1979 | Chivari | 64/11 R |

FOREIGN PATENT DOCUMENTS

| | | | |
|---|---|---|---|
| 2318612 | 11/1974 | Fed. Rep. of Germany | 64/11 R |
| 2530389 | 1/1977 | Fed. Rep. of Germany | 64/12 |
| 769173 | 2/1957 | United Kingdom | 64/12 |
| 502140 | 4/1976 | U.S.S.R. | 64/12 |

Primary Examiner—Ira S. Lazarus
Assistant Examiner—Magdalen Moy
Attorney, Agent, or Firm—McGlew and Tuttle

[57] ABSTRACT

A torsionally elastic shock and vibration absorbing coupling, comprises first and second coupling parts which are adapted to be connected to the respective parts which are to be coupled together and which have coupling portions with openings therethrough. An annular resiliently deformable pressure cushion is disposed between the coupling parts with the openings and is connected to each part such as by vulcanizing. At least one substantially non-stretchable rope which passes through the receiving openings of the respective coupling parts overlie the cushion, and extend circumferentially along portions of the respective parts and, between the parts, to interconnect them. The rope is directed preferably in a wave configuration with portions extending circumferentially and portions extending radially with respect to the respective coupling parts, and they advantageously include wave crests which extend or project outwardly from the cushion so that they form projections which provide for increased air circulation during rotation of the parts.

9 Claims, 23 Drawing Figures

TORSIONALLY ELASTIC SHOCK AND VIBRATION ABSORBING COUPLING

This is a division of application Ser. No. 861,449 filed Dec. 16, 1977 now abandoned.

FIELD AND BACKGROUND OF THE INVENTION

This invention relates in general to couplings and, in particular, to a new and useful torsionally elastic, shock and vibration absorbing coupling, comprising two coupling parts and, arranged therebetween, includes an annular, resiliently deformable pressure cushion having an arcuate cross-section, and a plurality of rope portions of at least one non-stretchable connecting rope, which portions are passed through rope passage openings provided in the coupling parts and are uniformly distributed over the circular extension of the pressure cushion while being laid around and connected to the same, and also to a method of manufacturing such a coupling.

DESCRIPTION OF THE PRIOR ART

A coupling of this kind is known from German Offenlegunsschrift No. 2,318,612, in which a pressure cushion is provided which comprises a case or cases of a flexible, impervious material filled with a gaseous or liquid pressure medium and in which the ropes made, for example, of plastic are passed around and may be embedded in the pressure cushion. Upon unequal rotary motions of the two coupling parts, the connecting ropes or their portions become taut and resiliently deform the pressure cushion.

This known construction requires filling of the case with a pressure medium under constant pressure. This pressure, however, which is determinative for the stiffness of the coupling may vary during operation due to temperature varitions, without taking into account leakage which can hardly be prevented and also entails changes in the characteristic of the coupling.

To avoid these drawbacks, the present invention is directed to a coupling which comprises a resiliently deformable pressure cushion having an arcuate cross-section and which is improved so as to be capable of transmitting higher torques. In this connection, the invention takes into account the well-known fact that localized high stresses are produced at the points of contact between the connecting ropes and the pressure cushion and that in the coupling of the prior art, because of the fulling work of the pressure cushion, the temperature increases to unduly high levels.

SUMMARY OF THE INVENTION

In accordance with the present invention, no filling with a pressure medium of the pressure cushion is provided, but at least one of the two surfaces of the pressure cushion is provided with projecting portions and/or recessed portions which, at least approximately, extend in the radial direction.

The projections and/or recesses enlarge the pressure cushion surfaces which come into contact with the air and through which the heat produced in the pressure cushion is dissipated to the ambient air. In addition, the radial extension of the projections and/or recesses result in advantageous conditions for a pumping effect, as far as the air flowing past the pressure cushion is concerned.

In a preferred embodiment of the invention, the outer surface of the pressure cushion is undulated in the circumferential direction and the location of the wave crests, which extend transversely to the circumference of the pressure cushion, is determined by the connecting rope portions vulcanized therein. Due to the undulatory configuration of the outer surface of the pressure cushion, the cushion surface dissipating the heat to the ambient air is considerably enlarged and the undulated surface causes a strong air turbulence which again supports the heat dissipation.

In some applications, however, a coupling having such an undulatory outer surface of the pressure cushion is undesirable, for example, if too strong an air turbulence and the raising of dust is to be prevented. A smooth outer surface is also perferable to avoid ventilation noise. In order to ensure a cooling of the pressure cushion also in such instances, it is advantageous to provide projections (ribs) or recesses on the inner surface of the pressure cushion, which extend radially and enlarge the surface.

By fixing the ropes to the pressure cushion equidistantly with the highest possible accuracy, a completely uniform stressing of the ropes and the cushion is obtained in both directions. This is of great advantage for both the life of the pressure cushion and the ropes or rope portions and for the loading capacity of the coupling. In addition, because of the uniform loading of the pressure cushion, only low bulges form between the rope portions, with the advantage that no unnecessary volume of material is present between the rope portions since such deformation would produce heat and would retard the thermal flow from the inside to the outside.

A development of the invention provides openings in the pressure cushion between the rope portions which lead from the inside of the pressure cushion to the outside. According to a particular embodiment of the invention, these openings have the shape of radially extending oblong slots which may grow larger toward the outer circumference of the pressure cushion. These openings produce a pumping effect or air propelling effect during rotation of the coupling, in addition to that caused by the undulatory surface, which results in a more intense air cooling of the pressure cushion, since heat is removed also from the inside of the cushion through these openings.

According to another development of the invention, individual fabric strips embedded in rubber are placed in juxtaposition between the pressure cushion and the connecting ropes or rope portions, with their joint areas offset relative to each other in the circumferential direction. Due to these individual fabric strips, the loading by the rope portions of the pressure cushion is distributed uniformly, so that no transverse strains are produced which might have an ill effect on the loading of the pressure cushion and, thereby, on the transmitting capacity of the coupling.

To further reduce the fulling work and, thereby, the heating of the pressure cushion, the pressure cushion is designed, in accordance with the invention, with a cross-section such that in the rest position, the connecting ropes or rope portions laid around the cushion form a semi-circle without tangential extensions. This reduces the misalignment of the ropes under load which would result in an increased fulling work of the pressure cushion. In addition, this provision makes the coupling stiffer against torsion.

This effect may still be increased, in accordance with the invention, by providing one or both of the coupling parts, which are connected to each other by the pressure cushion, with backing flanges against which the inner side of the pressure cushion applies or comes to apply under load.

In another embodiment of the invention intended for backing up the pressure cushion, an annular supporting or reinforcing body built up of fabric is vulcanized into the cushion close to the coupling parts. The pressure cushion is thereby additionally reinforced and its fulling work is reduced. In addition, a harder characteristic of the coupling is obtained thereby. To protect the pressure cushion against destruction, at least upon temporary overloads, cams are provided on the coupling parts, in a manner known per se, which butt against each other as soon as a predetermined torsion angle is reached. To reduce impacts, the contact surfaces of these cams may be coated with rubber.

In order to prevent the individual rope portions from becoming damaged or from growing longer with time or upon overload, so that the non-lengthened portions or ropes cause local overstressed in the pressure cushion, the rope passage openings in the coupling parts are provided, in accordance with the invention, with bushings or coatings, for example, of plastic. The friction of the ropes in the rope passage openings is thereby reduced considerably and a largely uniform permanent stress of the rope portions is ensured.

To secure the position of the rope portions, a particularly advantageous embodiment of the invention provides that a cage-like body of a plastic, suitable for vulcanization, or of rubber, is embedded in the pressure cushion, and that the radially extending rope portions rest against the radial bars thereof. In this design, it is particularly advantageous to provide the radial bars of the cage-like body with a layer of adhesive in order to fix the rope portions to the bars.

In another development of the invention, the pressure cushion is supported on the coupling parts in a bridge-like manner on bearing surfaces which are inclined relative to each other with the bearing surface of the inner coupling part forming an angle $\beta > 90°$ with the axis of rotation, and the bearing surface of the outer coupling part forming an angle $\alpha < 90°$ with the axis of rotation, both angles being considered in cross-sectional views. This design makes the pressure cushion particularly able to support load of the rope portions.

The invention provides further that the rope portions form part of a single continuous rope and that tangential connection grooves extend between every two adjacent rope passage openings of the respective coupling parts, through which the rope is continuously passed, and that these grooves have bottoms which are convexly arched to the outside in a manner such that the connecting rope can be passed through the adjacent rope passage openings without a sharp bend. This shape of the connection grooves considerably contributes to the protection of the connecting rope at the points of deflection and to a better introduction of the pressure components into the two coupling parts. By providing a single continuous rope for forming the rope portions, there is no need for the otherwise necessary great number of rope joints or rope-end fixations.

For couplings which have to transmit very high torques and/or absorb particularly high torque shocks, an embodiment has proven to be particularly advantageous in which two continuous connecting ropes are provided with the radially extending portions thereof offset laterally relative to one another, with the rope passage openings in the coupling parts being located on different arcs of circle.

In order to be able to use the inventive coupling in cases where a sleeve connection of the machine parts to be coupled is also desirable or needed, in another embodiment of the invention, the circumference of the outer coupling part is provided with tooth-like projections which extend into corresponding tooth spaces of a concentric coupling ring which has an internal toothed rim and can be secured to the machine to be connected. This embodiment has the additional advantage that a simple but effective overload protection can be provided on one of the coupling parts. This is done, in accordance with the invention, by providing rated breaking points in the tooth-like projections of the outer coupling part or the coupling ring, which are designed and/or located in a manner such that upon a predetermined overload, the tooth-like projections are sheared off.

The coupling ring, which can be secured to the machine to be connected and into the tooth spaces of which the tooth-like projections of the outer coupling part can simply be laterally introduced and which may also receive an outer coupling part of another coupling unit may be provided, in a manner known per se, with a simple flange and mounting holes by means of which the ring can be secured to the machine part to be coupled. To prevent noises which may be caused by the engagement of the teeth, the contact surfaces of the tooth-like projections and the corresponding surfaces of the tooth spaces of the outer coupling part or the coupling ring may be provided with a continuous elastomer coating.

In another design, the tooth-like projections of the outer coupling part or the coupling ring may be provided with caps of plastic or a similar material.

In a particular embodiment of the invention, a coupling assembly is formed of two coupling units of which each comprises an inner and an outer coupling part and pressure cushions with connecting ropes, with the units being symmetrically assembled to each other. In this construction, a liquid or gaseous coolant, for example, compressed air, is supplied from the shaft into the inner space between the pressure cushions, and outlet passages for the coolant are provided in the pressure cushions and/or between the flanges of the outer coupling parts. Such a coupling assembly has all of the advantages of the above described constructions and is excellently suitable for particularly high torques.

For manufacturing a coupling in accordance with the invention, a method has proven to be particularly advantageous in which the connecting rope is first passed through the rope passage openings of the coupling parts to be connected to each other and then all of these parts are placed in a corresponding vulcanizing mold, with the rope portions of the connecting rope received in recesses of the mold corresponding to elevations of the outer surface of the pressure cushion which may be provided, thereupon, the material for the pressure cushion to be vulcanized is introduced into the mold, the mold is closed with a cover, the inside of which is conformable to the provided shape of the pressure cushion and, finally, the vulcanizing operation is carried out in a manner known per se. This method of manufacture ensures an utmost accurate fixing of the rope portions in uniformly spaced relationship, so that after the mounting of the coupling in the machine, the rope portions and pressure cushions are stressed quite uniformly.

In a variation of the above manufacturing method, the position of the rope portions in the vulcanizing mold is not secured by recesses provided in the mold, but is secured by guide or positioning elements between which the rope portions are held in place. Such elements may be designed as thin ribs of pins which are arranged in rows. The pins may be of such a length that they extend up to the cover of the mold and thus penetrate the cavity of the mold completely. The result thereof is that, at the locations where the pins were provided in the vulcanizing mold, the finished pressure cushion is formed with through-holes which effect a cooling of the pressure cushion by ventilation during rotation of the coupling.

These guide or positioning elements projecting into the cavity of the vulcanizing mold and requiring no particular expenses make it possible to manufacture the pressure cushion with a smooth outer surface throughout, except for the small holes formed by the mentioned pins, with, in this instance again, a perfectly uniform spacing of the rope portions along the surface of the pressure cushion. In this design of the pressure cushion, its inner surface is provided with radially extending projections and/or recesses, as described hereinafter.

The invention is applicable to both couplings in which the pressure cushion and the connecting ropes or rope portions are disposed between coupling part flanges concentrically arranged within each other, and to couplings in which the coupling part flanges are adjacent and facing each other.

Particularly due to the cooperation of more or all of the features, the invention provides a most advantageous coupling capable of being subjected to alternating stresses (torque variations) and producing only a small amount of heat and is thus usable, for example, for drives with Diesel engines or drives of working machines with non-uniform loads.

Accordingly, it is an object of the invention to provide a torsionally elastic shock and vibration absorbing coupling, which comprises first and second coupling parts which have a plurality of circumferentially spaced receiving passages, with an annular resiliently deformable pressure cushion disposed between and connected to the first and second coupling parts and with at least one substantially non-stretchable rope having portions which pass through receiving openings of the respective coupling parts and overlie the pressure cushion and extend circumferentially along portions of the respective parts and between the first and second coupling parts to interconnect them and which have at least portions which define air propelling surfaces for moving the ambient air during movement of the associated coupling parts.

Another object of the invention is to provide a method of making a coupling which comprises placing the first and second coupling parts in a mold having guides for the rope portions of the couplings, introducing the material for the pressure cushion and closing the mold and vulcanizing the material with the ropes in position.

A further object of the invention is to provide a torsionally elastic shock and vibration absorbing coupling which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENTS

Referring to the drawings in particular, the invention embodied therein, comprises a coupling, generally designated 50, which includes a first coupling part 1a which is adapted to be connected to a part which is either driven or which drives, and which forms an inner coupling part and a second coupling part 2a which is adapted to be connected to the other part and which is disposed radially outwardly of the inner part 1a.

In accordance with the invention, the first coupling part includes a flange portion 1 with a plurality of passages 7 and the second coupling part 2a has corresponding passages 7' for receiving a substantially non-stretchable rope member which may comprise a single member or a plurality of individual elements which include portions 5a which extend through the respective passages 7 and 7' and interconnect the coupling parts together. The ropes 5 bear against an annular resiliently deformable pressure cushion 6 having each end connected to a respective coupling part 1a and 2a. The ropes 5 overlie the coupling part 6 and, advantageously, the cushion and/or the rope together, or separately, form air circulating recesses or projections for facilitating the flow of the ambient air in the vicinity of the coupling and the cooling thereof.

In FIGS. 1 to 3 and 6 to 13, an inner coupling part 1a is provided with a flange 1 which is secured to a shaft (not shown) of a driving or driven machine. Concentrically therewith and in the same plane, a flange 2 of an outer coupling part 2a is disposed, which part is secured, in a usual manner by means of screws, to a counter-flange (not shown) of a driven or driving machine (also not shown). The common axis of rotation of the coupling and machine is indicated at 46.

Figure 4:
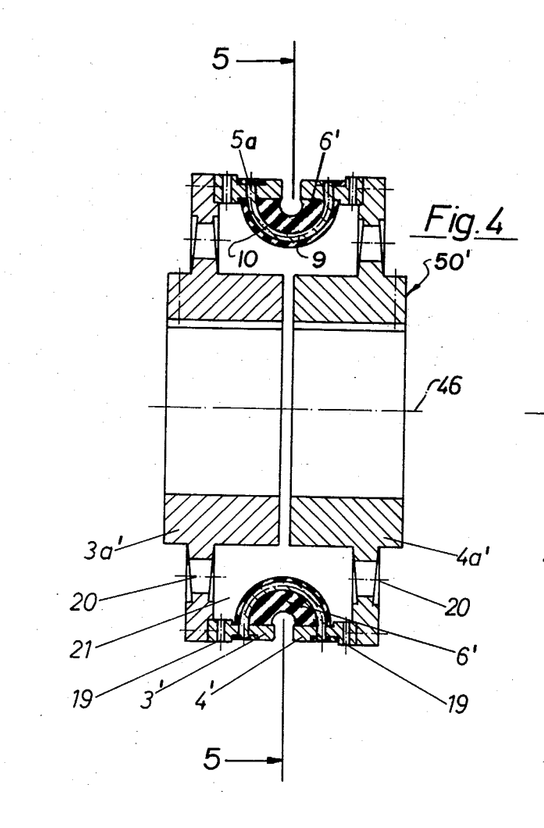
FIG. 4 is a view similar to FIG. 1 of another embodiment of the invention.
Figure 5:
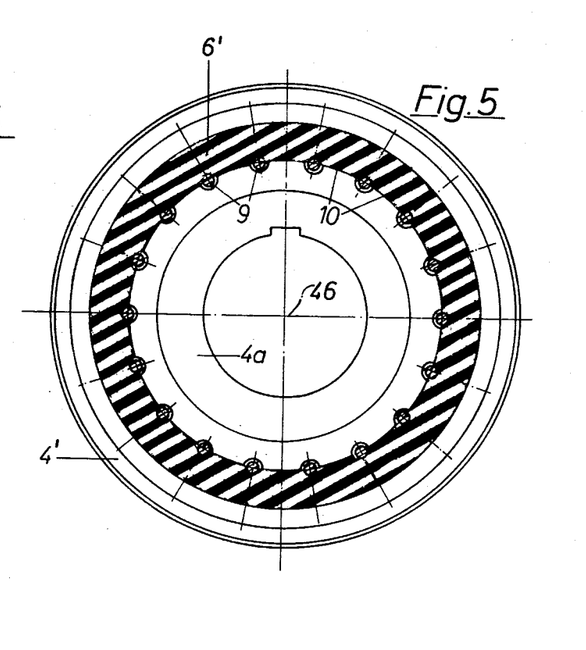
FIG. 5 is a section taken along the line 5—5 of FIG. 4.

In FIGS. 4 and 5, annular flanges 3' and 4' of a coupling 50' are disposed opposite each other and coupling parts 3a' and 4a' are adjacent each other and secured, by means of keys or the like, to an output or input shaft (not shown).

Coupling flanges 1 and 2, or 3 and 4, are connected to each other by means of a non-stretchable connecting rope 5 which is made, for example, of plastic and has portions 5a of which are distributed over the circumference equidistantly. Rope portions 5a rest on an annular and resiliently deformable pressure cushion 6 which is provided between the flanges, has an arcuate cross-section, and is connected to flanges 1 and 2, or 3 and 4, by vulcanization. Advantageously, the outside of the cross-section of pressure cushion 6 is approximately semicircular, without tangential extensions, in order to minimize the deflection of the rope portions 5a upon loading the coupling.

Figures 1, 2, 3:
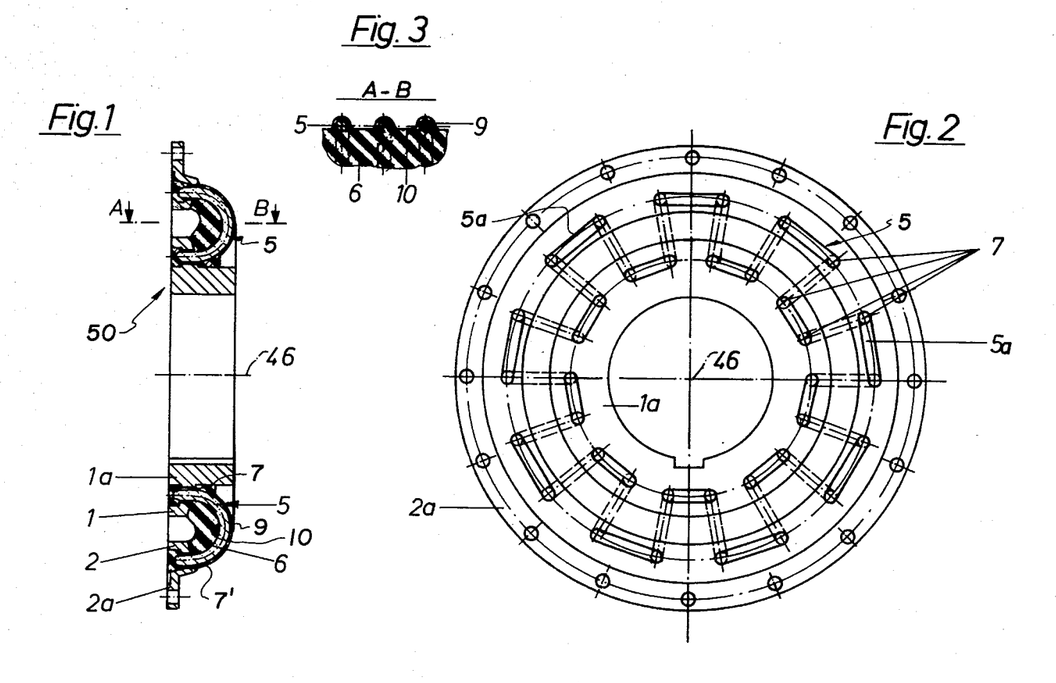
FIG. 1 is an axial sectional view of a coupling constructed in accordance with the invention.
FIG. 2 is an end elevational view of the coupling shown in FIG. 1.
FIG. 3 is a section taken along the line A–B of FIG. 1.

Rope portions 5a extend in axial and circumferential planes of the coupling and are formed by a single or even more ropes which, in accordance with FIG. 2, are passed consecutively through rope passage openings 7 which are provided in flanges 1 and 2, or 3 and 4. The connecting ropes may have a round cross-section, or they may be flat or belt-shaped, in which latter case, they apply better to the pressure cushion.

In accordance with the invention, as shown in FIGS. 1 to 3, rope portions 5a are connected to the pressure cushion 6 in a manner such that the outer surface thereof has an undulated or wave shape, with wave crests 9 extending transversely to the circumference of the pressure cushion and projecting approximately by the rope diameter from wave troughs 10. Wave crests 9 project radially relative to the center of the coupling. Due to this design of the pressure cushion, because of a satisfactory cooling, the transmission capacity of the coupling is substantially improved. In addition, the possibilities of manufacture are improved (exact distribution of the ropes over the circumference by placing in mold recesses).

In FIGS. 4 and 5, the undulations on the outer surface of a pressure cushion 6' protrude radially inwardly, which also produces a cooling effect due to air turbulence. A circulation of air in space 21 between the coupling parts and the pressure cushion is ensured by openings 19 in annular flanges 3' and 4', and by openings 20 in coupling parts 3a' and 4a'.

Figure 6:
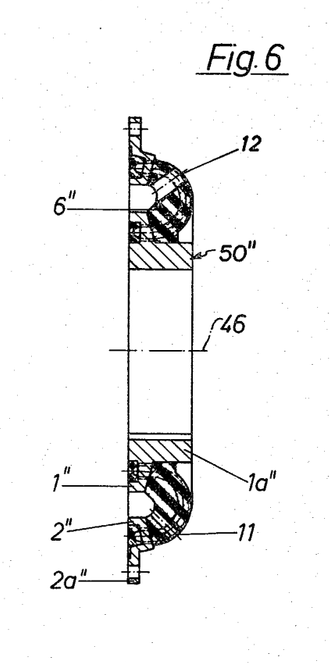
FIG. 6 is a view similar to FIG. 1 of another embodiment of the invention.
Figure 7:
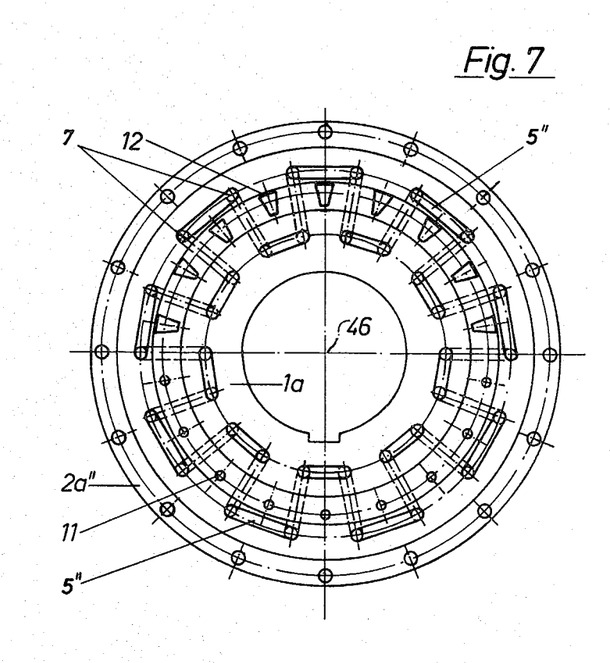
FIG. 7 is a side elevational view of the coupling shown in FIG. 6.

In FIGS. 6 and 7, a coupling 50'' includes a pressure cushion 6'' between rope portions 5'', with radially extending through-holes for additionally cooling the interior of the cushion, which are designed, in the lower portion of the figure, as round holes 11 and, in the upper portion, as slot-like oblong holes 12. These openings also influence the characteristic of the coupling.

Figure 8:
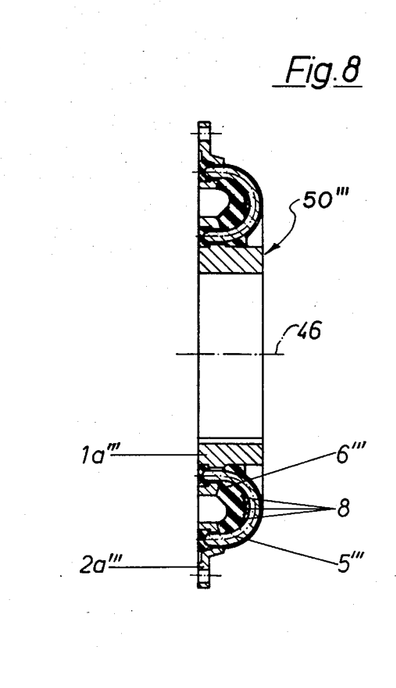
FIG. 8 is a view similar to FIG. 2 of another embodiment of the invention.
Figure 9:
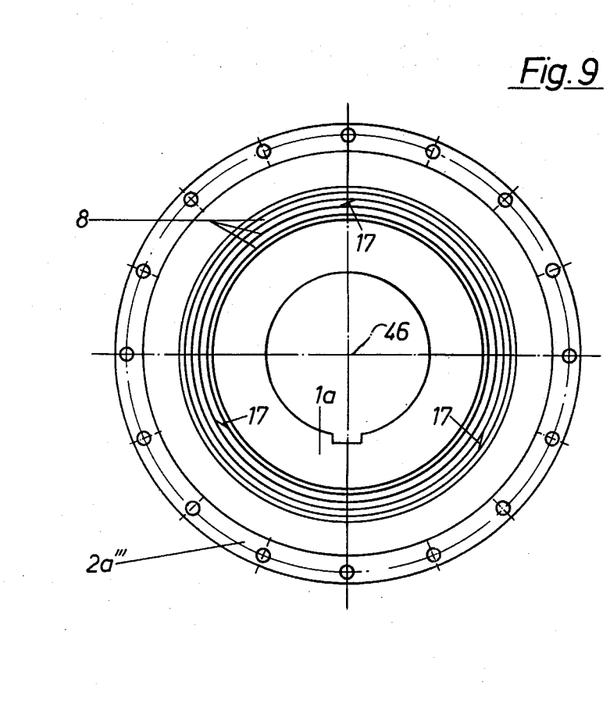
FIG. 9 is a side elevational view of the coupling shown in FIG. 8.

In FIGS. 8 and 9, a coupling 50''' includes juxtaposed fabrice strips 8 between pressure cushion 6''' and rope portions 5 and vulcanized therein, with their joint areas 17 offset relative to each other in the circumferential direction. Due to this provision, disadvantageous transverse stresses of pressure cushion 6''' upon load are avoided.

Figure 10:
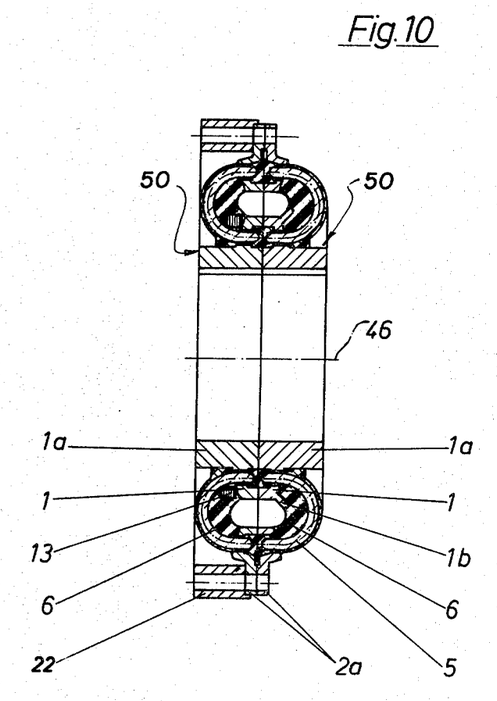
FIG. 10 is a view similar to FIG. 1 of another embodiment of the invention.

In FIG. 10, two couplings, 50, 50 of the construction shown in FIGS. 1–3 are assembled with each other to a coupling unit in a manner such that both coupling parts 1a are supported on a common input of output shaft (not shown) and both coupling parts 2a are secured to a common flange 22 of a driven or driving machine (not shown). In this example, in the righthand part of the coupling unit, flange 1 of inner coupling part 1a is provided, on its circumference, with a backing flange 1b against which pressure cushion 6 applies upon being loaded by the connecting ropes or rope portions 5. In the lefthand part of the example, instead of a backing flange, an annular supporting body 13 built up of fabric is vulcanized into pressure cushion 6 close to flange 1 of the inner coupling part 1a.

Figures 11, 12, 13:
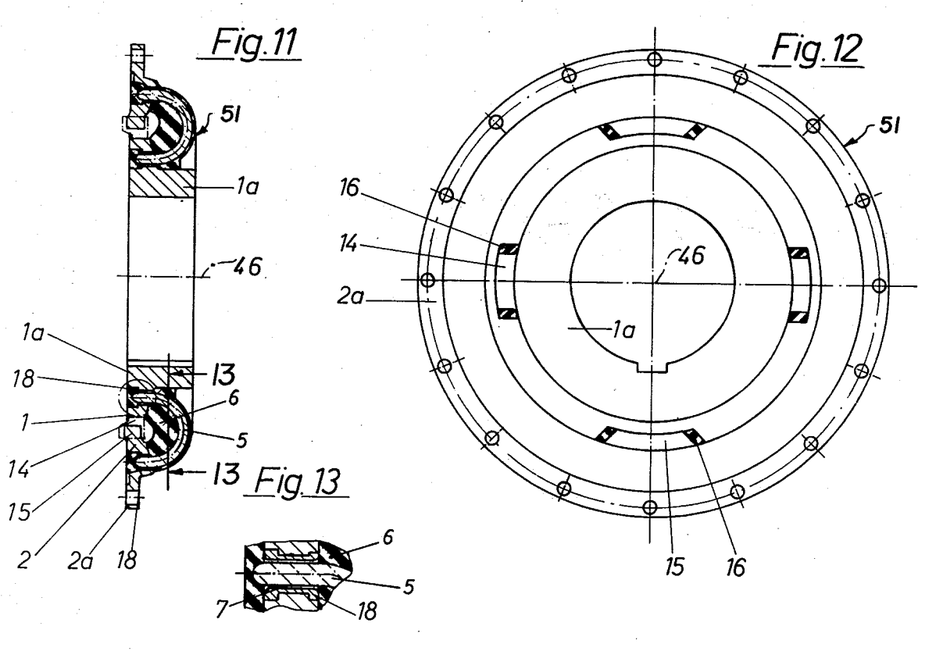
FIG. 11 is a view similar to FIG. 1 of still another embodiment of the invention.
FIG. 12 is a side elevational view of the coupling shown in FIG. 11.
FIG. 13 is a partial sectional view taken along the line 13—13 of FIG. 11.

In FIGS. 11 to 13, cams 14, 15 are provided on flange 1 of inner coupling part 1a and on flange 2 of outer coupling part 2a, respectively, of a coupling, generally designated 51. The cams 14 and 15 butt against each other upon overloading of the coupling. To reduce the shocks, the contact surfaces of the cams are provided with a rubber coating 16.

Further, in the embodiment of FIG. 13, rope passage openings 7, through which the loops of the connecting ropes or their portions 5 are passed, are provided with bushings 18 of plastic, to protect the ropes against wear through edge pressure.

Figure 14:
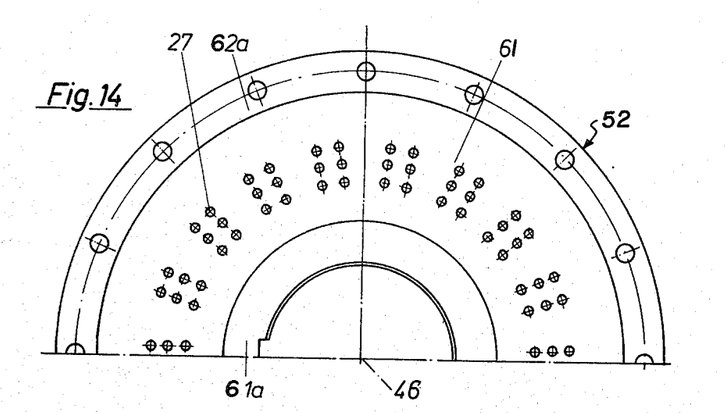
FIG. 14 is a partial end elevational view of another embodiment of the invention.
Figure 15:
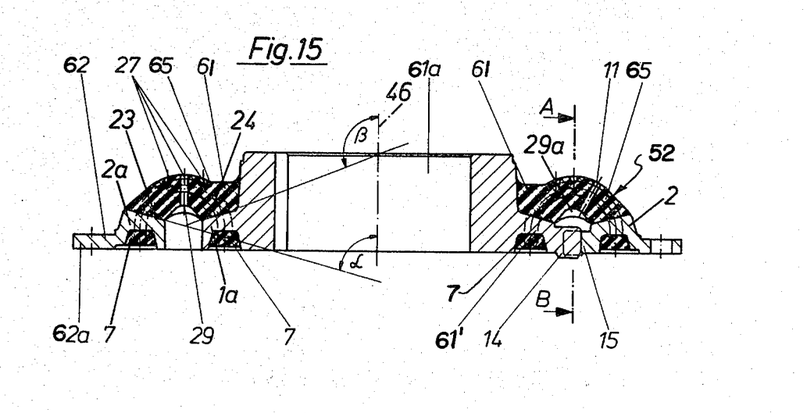
FIG. 15 is a sectional view similar to FIG. 2 of the embodiment shown in FIG. 14.

In the embodiment of FIGS. 14 and 15, coupling 52 includes a pressure cushion 6' supported bridge-like on bearing surface 23 of outer coupling part 62a and on bearing surface 24 of inner coupling part 61a, surface 23 forming an angle $\alpha < 90°$ and surface 24 an angle $\beta > 90°$ with the axis of rotation 46.

Figure 18:
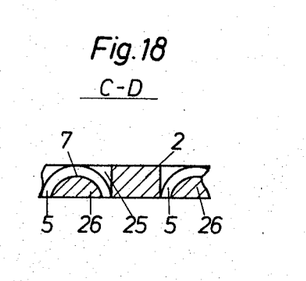
FIG. 18 is a section taken along the line C–D of FIG. 17.
Figure 19:
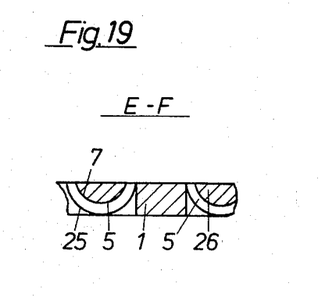
FIG. 19 is a section taken along the line E–F of FIG. 17.
Figure 20:
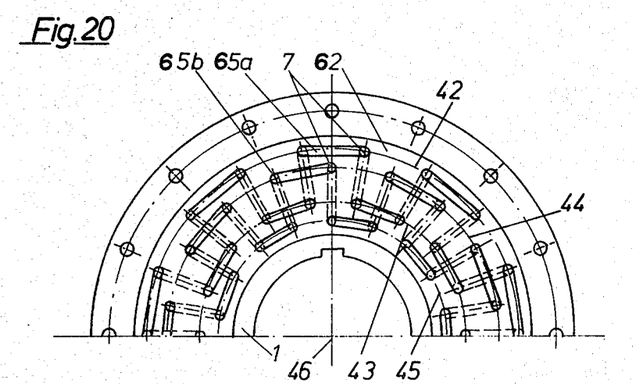
FIG. 20 is a partial side elevational view of still another embodiment of the invention.
Figure 21:
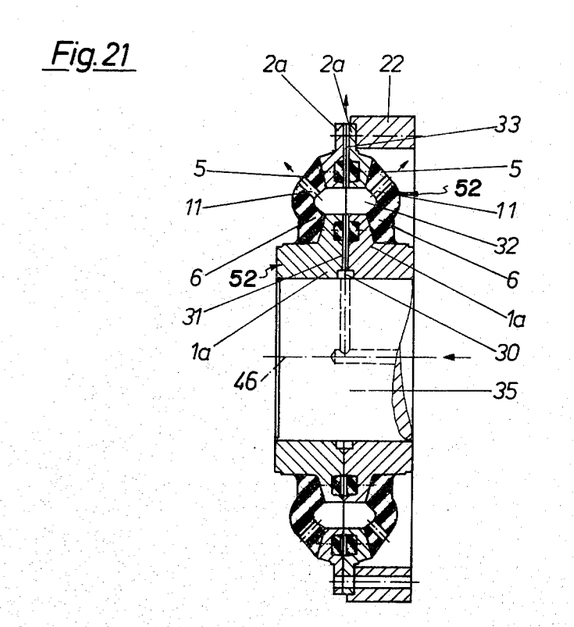
FIG. 21 is a view similar to FIG. 1 of another embodiment of the invention.

Rope portions 65 extend radially in axial planes of the coupling and they are formed, in FIGS. 14 through 19, by a single connecting rope, and in FIG. 20, by two ropes 65a and 65b which, in accordance with FIGS. 15 and 20, are passed successively through rope passage openigs 7 which are provided in coupling flanges 1 and 2.

In the coupling according to FIG. 20, which is particularly suited for transmitting higher torques or absorbing higher torque shocks, the rope portions of ropes 65a and 65b are arranged approximately parallel to each other, and rope passage openings 7, as well as their tangential connection grooves 25, are located in coupling parts 1a and 2a on circular arcs having unequal diameters.

FIGS. 18 and 19 show the design of tangential connection grooves 25 of rope passage openings 7 in coupling parts 1a, 2a. The bottoms of connection grooves 25 are convexly arched to the outside, with a curvature 26 with a radius as large as possible, in order to provide a firm and, at the same time, damage-preventing supporting surface for the connecting rope and to make it possible to pass the rope through passage openings 7 without a sharp bend.

The connecting ropes are advantageously secured at their ends by passing them through a common passage opening and heat-sealing them to each other.

Figure 17:
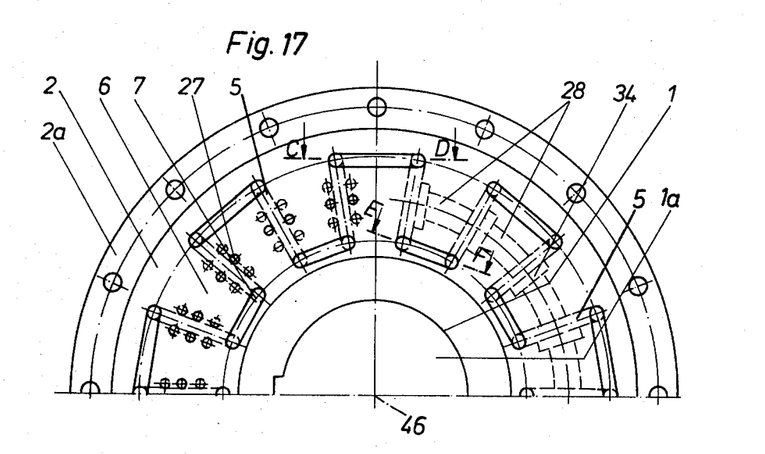
FIG. 17 is a view similar to FIG. 14 of another embodiment of the invention.

To manufacture the coupling according to FIG. 14 and the lefthand part of FIG. 17, rope portions 5 in their radial position and equidistantly spaced relationship in the cavity of the vulcanizing mold for the pressure cushion by rows of thin pins 27 which extend partly through the entire mold cavity and form holes in the finished pressure cushion which serve the purpose of cooling.

Figure 16:
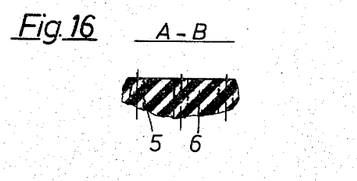
FIG. 16 is a section taken along the line A–B of FIG. 15.

In the righthand part of FIG. 17, rope portions 5 are fixed in the mold cavity by a cage-like body 28 of a vulcanizable plastic which is inserted into the cavity, and the rope portions are retained on the radial bars 34 of the body which are provided with an adhesive and the cage-like body remains in the pressure cushion. As shown in FIG. 16, rope portions 5 are embedded in pressure cushion 6 in a manner such that a smooth outer surface is obtained, with the exception of the small holes produced by pins 27 (cf. FIG. 14).

In FIG. 15, at the lefthand side, radial rib-like projections 29 are provided on the inner surface of pressure cushion 6, in order to enlarge the heat dissipating surface. In the righthand side of FIG. 15, recesses 29a are provided which enlarge the surface and from where round holes 11, as ventilation openings, penetrate pressure cushion 6 thoroughly between rope portions 5. These measures also influence the characteristic of the coupling.

At the righthand side of FIG. 15, cams 14 or 15, respectively, are provided in addition on flange 1 of the inner coupling part and on flange 2 of the outer coupling part, which may come into contact with each other upon overloading of the coupling. To reduce the shocks, the contact surfaces of the cams may be provided with a rubber coating.

According to FIG. 20, two couplings 52, 52 as shown in FIGS. 14 to 19 are assembled to a coupling unit in a manner such that the cavities of pressure cushions 6 oppose each other, and coupling parts 1a are carried on a common driving or driven shaft 35, while coupling parts 2a are secured to a common flange 22 of a driven or driving machine (not shown). From the center of shaft 35, through an annular space 30 and a slot 31 between coupling parts 1a, compressed air is supplied to interior space 32 formed by the construction of the pressure cushions 6. The air escapes partly through the outwardly extending round holes 11 in pressure cushions 6 and partly through a slot 33 provided between coupling parts 2a. This ensures a very efficient cooling of the pressure cushions.

Figure 22:
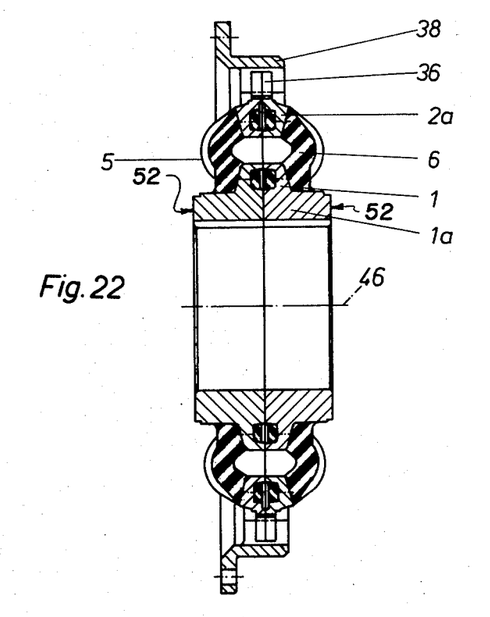
FIG. 22 is a view similar to FIG. 1 of yet another embodiment of the invention.
Figure 23:
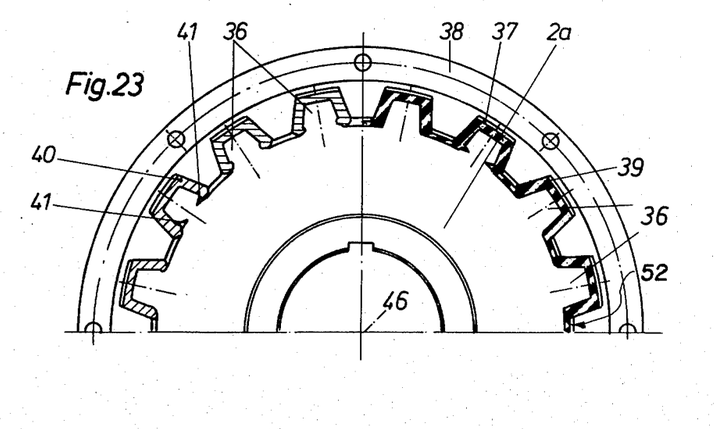
FIG. 23 is a side elevational view of the coupling shown in FIG. 22.

In the example of FIGS. 22 and 23, outer coupling part 2a of each coupling 52 is provided, on its circumference, with tooth-like projections 36 which extend into corresponding tooth spaces 37 of a concentric coupling ring 38 which is provided with an internal toothed rim and can be secured to the machine to be connected.

In FIG. 23 at the righthand side, the tooth-like projections 36 of outer coupling part 2a are provided with a continuous coating 39 of an elastomer, in order to prevent noise and destruction of the surfaces of the engaging parts.

At the lefthand side of FIG. 23, the tooth-like projections 36 are provided with caps 40 of plastic and, in addition, rated breaking points 41 are provided in the base zone of the tooth-like projections 36.

While specific embodiments of the invention have been shown and described in detail to illustrate the application of the principles of the invention, it will be understood that the invention may be embodied otherwise without departing from such principles.

What is claimed is:

1. A torsionally elastic shock and vibration absorbing coupling comprising first and second coupling parts each having a plurality of circumferentially spaced receiving passages, an annular resiliently deformable pressure cushion disposed between and connected to said first and second coupling parts, and at least one substantially non-stretchable rope having portions passing through receiving passages of the respective coupling part engaged on said cushion and extending circumferentially along portions of the respective parts and between said first and second coupling parts to interconnect them and having at least portions which define air propelling surfaces for moving the ambient air during movement of the associated coupling parts, said rope defining a radially extending projection forming the air propelling surface, said pressure cushion including an outer surface which is undulated and has a circumference with wave shapes extending transversely.

2. A torsional elastic shock and vibration absorbing coupling, according to claim 1 wherein said rope is vulcanized to said cushion.

3. A torsional elastic shock and vibration absorbing coupling, according to claim 2 wherein a distance from a crest to a trough of said wave shape is approximately equal to a diameter of said rope.

4. A torsionally elastic shock and vibration absorbing coupling according to claim 2, wherein said second coupling part is of a larger diameter than said first coupling part and extends radially outwardly of said first coupling part, said cushion and said rope extending substantially radially between said parts.

5. A torsionally elastic shock and vibration absorbing coupling according to claim 1, wherein the openings of said first and second coupling parts comprising plastic bushings.

6. A torsionally elastic shock and vibration absorbing coupling, according to claim 2, including passages defined in said pressure cushion from the interior of the cushion to the outside thereof.

7. A torsionally elastic shock and vibration absorbing coupling, according to claim 6, wherein said passages comprise oblong openings extending radially in said pressure cushion and growing larger in the direction of the outer circumference thereof.

8. A torsionally elastic shock and vibration absorbing coupling comprising a first coupling part comprising an annular member having a flange with a plurality of circumferentially spaced openings therethrough, a second coupling part comprising an annular member having a plurality of circumferentially spaced openings therethrough, annular resiliently deformable pressure cushion disposed between said first and second coupling parts and at least one substantially non-stretchable rope having portions passing through receiving passages of the respective coupling parts engaged on said cushion and extending circumferentially along portions of the respective parts and through at least some of the openings thereof to interconnect said first and second coupling parts with said cushion and having at least portions which define air propelling surfaces for moving ambient air during movement of the associated coupling parts, said rope extending through said cushion to define radially extending projections forming said air propelling surfaces, said pressure cushion including an outer surface which is undulated and has a circumference with wave shapes extending transversely, said ropes being vulcanized to said cushion and extending in said wave shapes.

9. A torsionally elastic shock and vibration absorbing coupling according to claim 8, wherein said first and second coupling parts are of substantially the same diameter and are arranged side-by-side, said rope and said cushion extending substantially axially between said first and second coupling parts.

* * * * *